United States Patent
Zhou et al.

(10) Patent No.: US 11,105,617 B2
(45) Date of Patent: Aug. 31, 2021

(54) HYBRID LIGHT MEASUREMENT METHOD FOR MEASURING THREE-DIMENSIONAL PROFILE

(71) Applicant: Xi'an Chishine Optoelectronics Technology Co., Ltd., Xi'an (CN)

(72) Inventors: Xiang Zhou, Xi'an (CN); Yuqin Li, Xi'an (CN); Huanhuan Li, Xi'an (CN); Quan Li, Xi'an (CN); Tao Yang, Xi'an (CN); Li Ma, Xi'an (CN); Di Guo, Xi'an (CN); Dong Yao, Xi'an (CN)

(73) Assignee: XI'AN CHISHINE OPTOELECTRONICS TECHNOLOGY CO., LTD, Xi'an (CN)

( * ) Notice: Subject to any disclaimer, the term of this patent is extended or adjusted under 35 U.S.C. 154(b) by 0 days.

(21) Appl. No.: 16/776,294

(22) Filed: Jan. 29, 2020

(65) Prior Publication Data

US 2020/0166333 A1 May 28, 2020

Related U.S. Application Data

(63) Continuation of application No. PCT/CN2017/115007, filed on Dec. 7, 2017.

(51) Int. Cl.
*G01B 11/24* (2006.01)
*G01B 11/25* (2006.01)
(Continued)

(52) U.S. Cl.
CPC ........ *G01B 11/2518* (2013.01); *G02B 26/085* (2013.01); *G01B 11/2536* (2013.01); *G06T 7/521* (2017.01)

(58) Field of Classification Search
CPC ........ G01B 11/24; G01B 11/25; G01B 11/306; G01B 11/245; G06T 7/0057
(Continued)

(56) References Cited

U.S. PATENT DOCUMENTS

| 7,545,516 B2 * | 6/2009 | Jia ................. | G01B 11/2527 356/602 |
| 2009/0322859 A1 * | 12/2009 | Shelton ............. | G01B 11/2513 348/46 |

FOREIGN PATENT DOCUMENTS

| CN | 1758020 A | 4/2006 |
| CN | 103292733 A | 9/2013 |

(Continued)

OTHER PUBLICATIONS

International Search Report of PCT/CN2017/115007.
Written Opinion of PCT/CN2017/115007.

*Primary Examiner* — Md M Rahman
(74) *Attorney, Agent, or Firm* — Dragon Sun Law Firm, PC; Jinggao Li, Esq.

(57) ABSTRACT

A hybrid light measurement method for measuring a three-dimensional profile comprises: Step 1 using a MEMS laser projector to realize projection of a laser stripe and a fringe pattern: and Step 2 performing matching to obtain a parallax, and incorporating a binocular stereo vision to perform reconstruction. The present disclosure employs MEMS projection technology to realize a hybrid measurement system capable of performing laser stripe measurement and fringe pattern measurement, thereby realizing quick measurement of three-dimensional profiles of objects having different surface properties. The present disclosure enables laser stripe measurement and fringe pattern measurement to be performed by the same measurement system without needing any additional hardware equipment. The projection device used in the present disclosure enables projection of (Continued)

multiple laser stripes, thereby increasing measurement precision and speed.

4 Claims, 2 Drawing Sheets

(51) Int. Cl.
 *G02B 26/08* (2006.01)
 *G06T 7/521* (2017.01)
(58) Field of Classification Search
 USPC .......................................................... 356/601
 See application file for complete search history.

(56) References Cited

FOREIGN PATENT DOCUMENTS

| | | |
|---|---|---|
| CN | 105303572 A | 2/2016 |
| CN | 106041937 A | 10/2016 |
| CN | 106767527 A | 5/2017 |
| JP | 2001330417 A | 11/2011 |

* cited by examiner

HYBRID LIGHT MEASUREMENT METHOD FOR MEASURING THREE-DIMENSIONAL PROFILE

CROSS-REFERENCE TO RELATED APPLICATIONS

This application is a bypass continuation application of PCT Application No. PCT/CN2017/115007. This Application claims priority from PCT Application No. PCT/CN2017/115007 filed Dec. 7, 2017, CN Application No. CN 201611117498.5 fled Dec. 7, 2016, the contents of which are incorporated herein in the entirety by reference.

Some references, which may include patents, patent applications, and various publications, are cited and discussed in the description of the present disclosure. The citation and/or discussion of such references is provided merely to clarify the description of the present disclosure and is not an admission that any such reference is "prior art" to the present disclosure described herein. All references cited and discussed in this specification are incorporated herein by reference in their entireties and to the same extent as if each reference was individually incorporated by reference.

FIELD

The present disclosure relates to the field of optical detection, and relates to a hybrid light measurement method for measuring a three-dimensional profile, which is a hybrid three-dimensional measurement method combining laser stripe measurement and fringe pattern measurement.

BACKGROUND

Three-dimensional scanning technology is more and more widely used. To achieve fast and accurate three-dimensional measurement of objects, a stereo vision method with multiple cameras for photography and a structured light method with fringe projection are usually adopted. A traditional phase-shifting profilometry method can measure objects with any curved surface shape, and is wide in measurement range, but this method has the difficult calibration and reflectivity problems. A binocular stereo vision method is simple in measurement system but has the problem of difficult matching. In the case of combining the two methods, in which the phase-shifting profilometry method is used to measure an absolute phase value, and the stereo vision method is used to perform feature matching, not only is the problem of "difficult matching" in stereo vision solved, but also the system structure is simplified, and the measurement accuracy is improved. However, the range of objects that can be measured by this method is limited. Highly reflective objects, such as metal surfaces cannot be measured. The reflectivity of a highly reflective surface is not uniform at different angles, resulting in local overexposure and failure of measurement.

A linear structured light measurement method is a traditional three-dimensional measurement method, and involves an active measurement technology with structured light. The linear structured light measurement method, also known as a laser stripe method, uses an image of one or more light rays (laser stripes) to reproduce a three-dimensional contour of an object. That is, a center position of the laser stripe is extracted from the laser stripe image, and then point-by-point solving is performed on the laser stripe center by using the principle of triangulation to obtain three-dimensional profile data. This technology has the advantages of non-contact, high sensitivity, good real-time performance, and strong anti-interference ability, and can also measure highly reflective surfaces such as metal surfaces. However, it has the disadvantage that a motion mechanism is needed to support scanning, which reduces the measurement efficiency and accuracy. In spite of low measurement efficiency, it is used to measure highly reflective objects such as metal objects. For example, in industrial production, laser stripes have important significance in measuring profiles of complex precision parts such as aero-engine blades, steam turbine blades, bevel gears, and helical gears.

Currently, due to the limitation of a projection device, a fringe pattern method and a laser stripe method must be implemented with two measurement systems. Generally, the fringe pattern method requires white light projection, and cannot achieve laser stripe scanning, while laser cannot achieve projection of a fringe pattern, so it is impossible to achieve hybrid measurement using the two methods through the same light source.

Therefore, a heretofore unaddressed need exists in the art to address the aforementioned deficiencies and inadequacies.

SUMMARY

An object of the present disclosure is to overcome the foregoing shortcomings in the prior art, and provide a three-dimensional measurement method combining laser stripe measurement and fringe pattern measurement. The measurement method employs MEMS projection technology to realize a hybrid measurement system capable of performing laser stripe measurement and fringe pattern measurement, thereby realizing quick measurement of three-dimensional profiles of objects having different surface properties.

The object of the present disclosure is achieved by the following technical solution:

A hybrid light measurement method for measuring a three-dimensional profile includes: Step 1, selecting a measurement mode through adaptive recognition, by a camera, of surface reflectivity characteristics of an object, wherein mode I is a laser stripe measurement mode; mode II is a fringe pattern measurement mode; and mode III is a laser stripe and fringe pattern measurement mode; programming and projecting, by using an MEMS laser projection device, a laser stripe scanned along a camera baseline; emitting, by a projection device, a synchronization signal to trigger the camera to capture a sequence of laser stripe images reflected by the surface of the object, transmitting the laser stripe images to a computer for processing, and then projecting, by using the same projection device, a programmable laser sine fringe pattern to the surface of the object, performing n-steps phase shifting with $2\pi/n$ step length, enabling the camera to synchronously capture n fringe pattern images reflected by the surface of the object, and transmitting the fringe pattern images to the computer for processing;

Step 2, performing epipolar rectification on the laser stripe pictures taken by the camera and processed in the computer and the fringe pattern pictures projected by the projection device and processed in the computer, and extracting center pixel coordinates of all laser stripes, performing line-by-line matching to obtain a parallax image, and performing three-dimensional reconstruction on the object by using the parallax image and binocular stereo vision calibration results in mode I; or performing epipolar rectification on the acquired fringe pattern pictures, calculating a phase of each point in each picture, and performing phase unwrapping, performing line-by-line matching by using the same phase to obtain a parallax image, and performing three-dimensional reconstruction on the object by using the parallax image and the binocular stereo vision calibration results in mode II; or simultaneously calculating the two types of parallax images in mode I and mode II, performing three-dimensional reconstruction on the object by using the parallax image in mode I and the binocular stereo vision calibration results, and also performing three-dimensional reconstruction on the object by using the parallax image in mode II and the binocular stereo vision calibration results, to obtain two types of three-dimensional point cloud data, and fusing the two types of three-dimensional point cloud data according to the surface reflectivity characteristics of the object to obtain a complete object surface profile in mode III. In step 1, adaptive recognition of surface reflectivity characteristics of an object is performed by a camera, that is, before measurement, the fringe pattern images of the tested object are acquired, and gray scale distribution and the contrast of the pictures are calculated, and if the contrast is lower than a set threshold or the gray scale reaches 255, the laser stripe measurement mode is selected for the area, and the area is set as an ROI (region of interest) to get ready for subsequent reconstruction, and the fringe pattern measurement mode is selected for the remaining area.

A first step for setting optical parameters of a system: determining an operating range of the fringe pattern or laser stripe, and determining, according to an operating distance, a maximum operating distance $L_2$ and a minimum operating distance $L_1$, a maximum spot radius $\omega_{max}$ within the range of the depth of field $\Delta L$, and a number M of lines scanned for a single frame of fringe pattern image or laser stripe, wherein M is determined by characteristics of the laser beam;

a second step for generating drive signals: calculating parameters of drive signals of the MEMS galvanometer and the laser according to the system parameters determined in the first step, and generating the drive signals, which include: 1) an MEMS scanning galvanometer fast-axis drive signal; 2) an MEMS scanning galvanometer slow-axis drive signal; and 3) a laser drive signal; and a third step for generating fringe patterns or laser stripes: driving, by the galvanometer drive signals generated in the second step, the MEMS galvanometer to perform two-dimensional scanning; driving, by the laser drive signal generated in the second step, the laser to generate a laser beam with continuously modulated light intensity; radiating the laser beam to the surface of the galvanometer at a certain incident angle, and then reflecting the laser beam by the galvanometer to the surface of the object to form an analog fringe pattern with continuously modulated light intensity; and changing a frequency and a phase of the laser drive signal, to obtain fringe patterns with different fringe pattern pitches and phases; similarly, performing scanning, by the MEMS galvanometer, in the horizontal direction through a fast axis, and projecting a line of laser stripes in one scanning cycle; performing scanning in the vertical direction through a slow axis, and projecting a frame of laser stripes in one scanning cycle; wherein when matched with a frame rate of the camera, one laser stripe can be acquired in each frame to achieve large-resolution multi-light-pattern projection measurement.

In step 2: in a fringe pattern method, each point in a deformed fringe image captured by the camera corresponds to a specific absolute phase value, sub-pixel matching of corresponding points in a left image and a right image is quickly achieved by using absolute phase and geometric epipolar constraints, and after the sub-pixel matching, a parallax $d_w$ of each point is obtained from left and right absolute phase maps; and in a laser stripe method, the position of a centroid of the laser stripe, that is, the position of a contour point of the tested object there, is obtained by a gray centroid method, and to ensure orderly solving of the parallax of the two images, corresponding laser stripes or light spots in the two images need to be numbered in a matched manner to achieve fast matching to obtain the parallax.

Based on a parallax image thus obtained, after internal and external parameters of the camera are calibrated, three-dimensional coordinates of spatial points are reconstructed by using a binocular stereo vision. For example, depth information of the tested object is obtained according to an optical triangulation method by using the parallax principle in a binocular stereo vision; and the parallax $d_w$ obtained in step 2 is substituted into formula (1) to reconstruct three-dimensional coordinates of spatial points; wherein a triangular relationship is used to obtain three-dimensional world space coordinates of P:

$$\begin{cases} x^w = -\dfrac{bu_1}{d_w} \\ y^w = \dfrac{bh}{d_w} \\ z^w = \dfrac{bf}{d_w} \end{cases} \quad (1)$$

in the formula, f is a principal distance, and b is a baseline length; world coordinates of a spatial point P are $(x^w, y^w, z^w)$ and coordinates of P in left and right camera imaging planes are P1 $(u_1, v_1)$ and P2 $(u_2, v_2)$, respectively.

In mode I, epipolar rectification is performed on the laser stripe pictures taken by the camera and processed in the computer, and center pixel coordinates of all laser stripes are extracted, line-by-line matching is performed to obtain a parallax image, and three-dimensional reconstruction is performed on the object by using the parallax image and binocular stereo vision calibration results;

in mode II, epipolar rectification is performed on the acquired fringe pattern pictures, a phase of each point in each picture is calculated, and phase unwrapping is carried out, line-by-line matching is performed by using the same phase to obtain a parallax image, and three-dimensional reconstruction is performed on the object by using the parallax image and the binocular stereo vision calibration results; and in mode III, the two types of parallax images in mode I and mode. II are simultaneously calculated, three-dimensional reconstruction is performed on the object by using the parallax image in mode I and the binocular stereo vision calibration results, and three-dimensional reconstruction is also performed on the object by using the parallax image in mode II and the binocular stereo vision calibration results, to obtain two types of three-dimensional point cloud data, and the two types of three-dimensional point cloud data are fused according to the surface reflectivity characteristics of the object to obtain a complete object surface profile. Beneficial effects: the present disclosure enables laser stripe measurement and fringe pattern measurement to be performed by the same measurement system without needing any additional hardware equipment. The projection device used in the present disclosure enables projection of multiple laser stripes, thereby increasing measurement precision and speed.

BRIEF DESCRIPTION OF THE DRAWINGS

The accompanying drawings illustrate one or more embodiments of the present invention and, together with the written description, serve to explain the principles of the invention. Wherever possible, the same reference numbers are used throughout the drawings to refer to the same or like elements of an embodiment.

Figure 1:
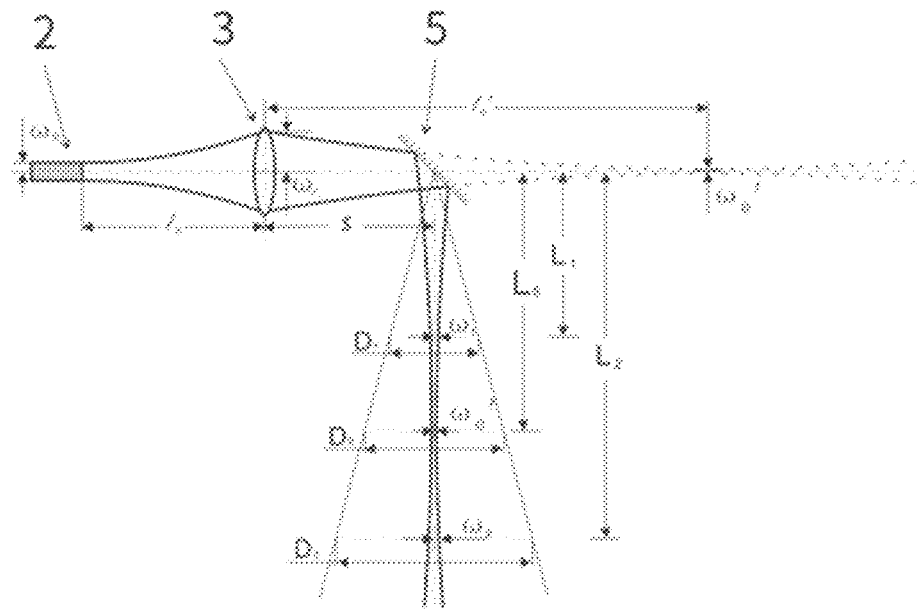
FIG. 1 is a working principle diagram of the present disclosure.
Figure 2:
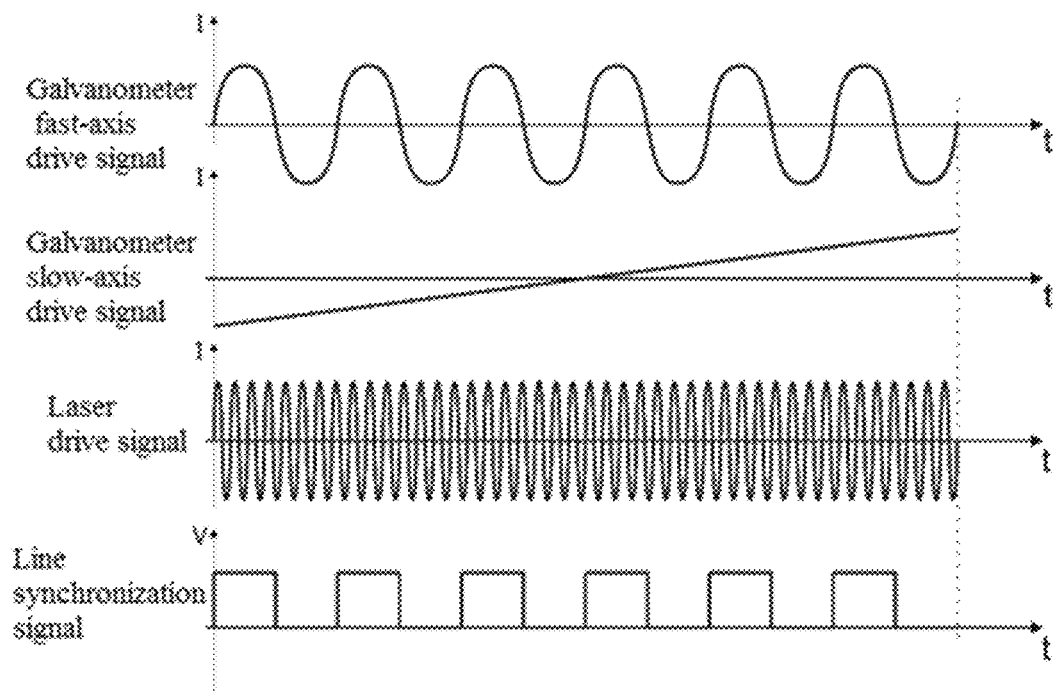
FIG. 2 is a timing relationship diagram of a fringe pattern line synchronization signal in the present disclosure.

Reference numerals: 1: drive board; 2: laser 3: collimating lens; 4: mirror; 5: MEMS galvanometer; 6: aspheric lens; 7: fringe pattern image; 8: circular diaphragm; 9: laser beam; 10: computer.

DETAILED DESCRIPTION OF THE EMBODIMENTS

The present invention will now be described more fully hereinafter with reference to the accompanying drawings, in which exemplary embodiments of the present invention are shown. The present invention may, however, be embodied in many different forms and should not be construed as limited to the embodiments set forth herein. Rather, these embodiments are provided so that this disclosure is thorough and complete, and will fully convey the scope of the invention to those skilled in the art. Like reference numerals refer to like elements throughout.

Embodiments of the invention are illustrated in detail hereinafter with reference to accompanying drawings. It should be understood that specific embodiments described herein are merely intended to explain the invention, but not intended to limit the invention.

The present disclosure will be further described in detail below in conjunction with the accompanying drawings.

Referring to FIGS. 1, 2, 3 and 4, a hybrid light measurement method for measuring a three-dimensional profile, in which laser stripe measurement and fringe pattern measurement are performed by the same measurement system without needing any additional hardware equipment.

First Step: Using a MEMS Laser Projector to Realize Projection of a Laser Stripe and a Fringe Pattern First, adaptive recognition of surface reflectivity characteristics of an object is performed by a camera, that is, before measurement, fringe pattern images of the tested object are acquired, and gray scale distribution and the contrast of the pictures are calculated, and if the contrast is lower than a set threshold or the gray scale reaches 255, the laser stripe measurement mode is selected for the area, and the area is set as an ROI to get ready for subsequent reconstruction, and the fringe pattern measurement mode is selected for the remaining area.

A gray scale value of each point is:

$$I_1 = A + B\cos(\varphi + \frac{\pi}{2}i) \quad (2)$$

Four-step phase shifting is adopted at high frequencies herein. Therefore, the phase is shifted by $$\frac{\pi}{2}$$

in each step to obtain four equations as follows:

$$\begin{cases} I_1 = A + B\cos(\varphi) \\ I_2 = A - B\sin(\varphi) \\ I_3 = A - B\cos(\varphi) \\ I_4 = A + B\sin(\varphi) \end{cases} \quad (3)$$

A fringe contrast B can be obtained:

$$B = \frac{1}{4}\left(\frac{I_1 - I_3}{\cos\varphi} + \frac{I_2 - I_4}{\sin\varphi}\right) \quad (4)$$

As shown in FIG. 1, after fiber coupling of three identical semiconductor lasers, light is incident on a beam combining prism to form a laser beam. After being collimated by a lens, the laser beam is reflected by a reflector mirror onto an MEMS galvanometer. Excited by a fast-axis current and a slow-axis current, the MEMS galvanometer generates bimodal vibrations perpendicular to each other to project the laser beam to different positions, thus achieving two-dimensional scanning. Under the actions of a sinusoidal drive current and a synchronization signal, the lasers are subjected to light intensity modulation to finally form a high-resolution sinusoidal fringe pattern.

A DLP performs area array projection for imaging, by virtue of deflection of a micro-mirror array integrated on a DMD to project images. As an image is composed of discrete pixels with limited resolution, the number of projected laser stripes is limited, and multiple laser stripes cannot be projected, which affects the measurement accuracy. The MEMS laser projector uses the MEMS galvanometer to scan horizontally through the fast axis and project a line of laser stripes in one scanning cycle; and the MEMS laser projector uses the MEMS galvanometer to scan vertically through the slow axis and correspondingly project one frame of laser stripes in one cycle. When matched with a frame rate of the camera, one laser stripe can be acquired in each frame. In this way, large-resolution multi-light-pattern projection measurement can be achieved. The MEMS laser projector can achieve high accuracy in spot quality, fineness, straightness, uniformity, and depth of field.

Second Step: Performing Matching to Obtain a Parallax

In a fringe pattern method, each point in a deformed fringe image captured by the camera may correspond to a specific absolute phase value. Sub-pixel matching of corresponding points in a left image and a right image may be quickly achieved by using absolute phase and geometric epipolar constraints. After the sub-pixel matching, a parallax $d_w$ of each point can be obtained from left and right absolute phase maps.

In a laser stripe method, the position of a centroid of the laser stripe, that is, the position of a contour point of the tested object there, is obtained by a gray centroid method. To ensure orderly solving of the parallax of the two images, corresponding laser stripes or light spots in the two images need to be numbered in a matched manner to achieve fast matching to obtain the parallax.

Third Step: Incorporating a Binocular Stereo Vision to Perform Reconstruction

Based on a parallax image thus obtained, after internal and external parameters of the camera are calibrated, three-dimensional coordinates of spatial points can be reconstructed by using binocular stereo vision.

1. Measurement by a Fringe Pattern Method

Figure 3:
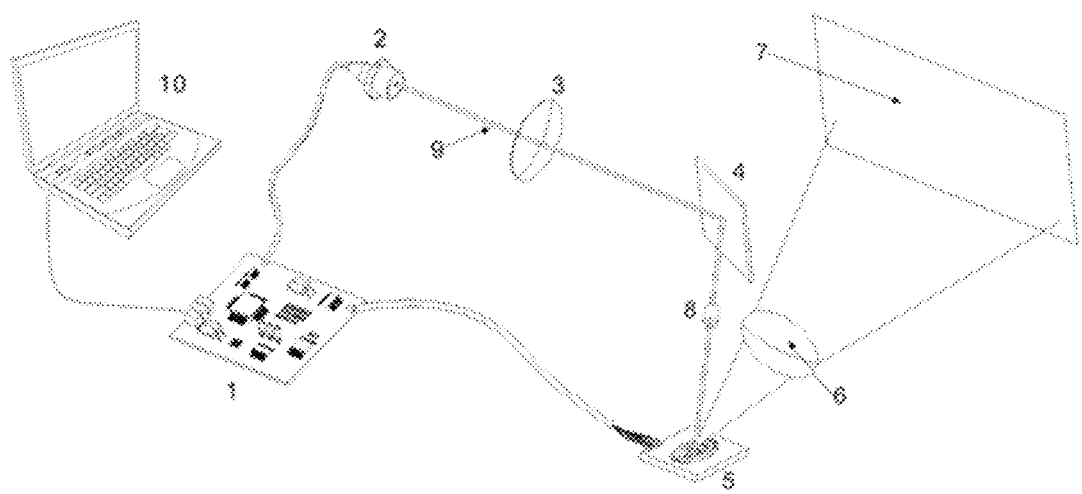
FIG. 3 is a timing relationship diagram of a laser stripe line synchronizing signal in the present disclosure.
Figure 4:
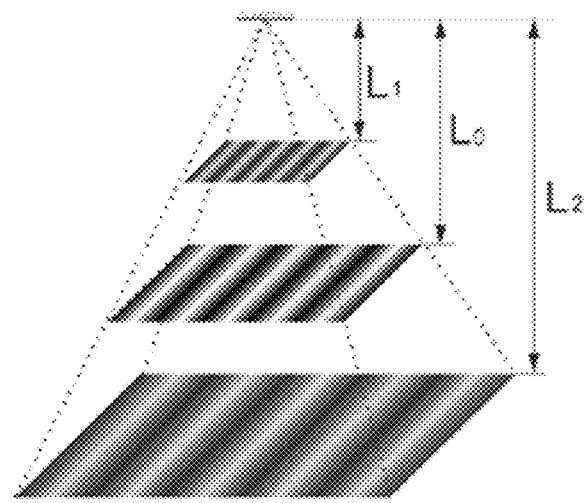
FIG. 4 is a system structure diagram of the present disclosure.

First Step: Realizing Fringe Pattern Projection by Using an MEMS Laser Projector As shown in FIG. 3, subjecting a laser beam emitted by a laser (which may be a plurality of lasers in different bands) to focusing and collimating with a collimating lens to obtain a collimated Gaussian laser beam meeting design requirements of the first step; to reduce the light path volume, reflecting the laser beam by a mirror once, and causing the laser beam to pass through a circular diaphragm and be incident on an MEMS galvanometer, wherein the functions of the diaphragm are to remove stray light around the beam, and improve spot shape and quality; reflecting the beam by the MEMS galvanometer to the surface of a tested object; controlling the laser by a sinusoidal current signal generated by a drive board to perform sinusoidal or cosinusoidal modulation on the brightness of the laser beam; and exciting the MEMS galvanometer by a drive signal generated by the drive board to turn two-dimensionally, so as to drive the laser beam to perform scanning, thus generating a fringe pattern image. An aspheric lens may correct the distortion of the fringe pattern image to ensure that a high-quality fringe pattern image without distortion is obtained.

Second Step: Performing Matching to Obtain a Parallax 1) calibrating a binocular stereo vision system to obtain internal parameters and position and attitude parameters of a left camera and a right camera;

2) projecting, by the projector, a phase shifting fringe image, and capturing, by the left camera and the right camera, deformed phase shifting fringe images;

3) performing image correction on the pair of left and right images to obtain a standard epipolar geometric structure;

4) obtaining absolute phase distribution in the deformed phase shifting fringe images with high precision by using a tri-frequency variable precision unwrapping technology;

5) finding a matching point set, for all pixels of the left image, in the right image to achieve pixel-level rough matching by taking the left image as a reference in conjunction with absolute phase and geometric epipolar constraints.

6) performing two-dimensional interpolation in the neighborhood of an original point and an initial matching point, and using an NCC template matching algorithm to achieve sub-pixel matching, to obtain a parallax $d_w$ of each point from the left and right absolute phase images.

Third Step: Incorporating a Binocular Stereo Vision to Perform Reconstruction obtaining depth information of the tested object according to an optical triangulation method by using the parallax principle in binocular stereo vision; and substituting the parallax $d_w$ obtained in the previous step into formula (5) to reconstruct three-dimensional coordinates of spatial points, wherein a triangular relationship is used to obtain three-dimensional world space coordinates of P:

$$\begin{cases} x^w = -\dfrac{bu_1}{d_w} \\ y^w = \dfrac{bh}{d_w} \\ z^w = \dfrac{bf}{d_w} \end{cases} \quad (5)$$

in the formula, f is a principal distance, and b is a baseline length; world coordinates of a spatial point P are ($x^w$, $y^w$, $z^w$), and coordinates of P in left and right camera imaging planes are P1 ($u_1$, $v_1$) and P2 ($u_2$, $v_2$) respectively.

2. Measurement by a Laser Stripe Method

First Step: Realizing Laser Stripe Projection by Using a MEMS Laser Projector 1) as shown in FIG. 3, subjecting a laser beam emitted by a laser (which may be a plurality of lasers in different bands) to focusing and collimating with a collimating lens 3 to obtain a collimated Gaussian laser beam meeting design requirements of the first step; to reduce the light path volume, reflecting the laser beam by a mirror once, and causing the laser beam to pass through a circular diaphragm and be incident on an MEMS galvanometer, wherein the functions of the diaphragm are to remove stray light around the beam, and improve spot shape and quality; reflecting the beam by the MEMS galvanometer to the surface of a tested object; and exciting the MEMS galvanometer by a drive signal generated by the drive board to turn two-dimensionally, so as to drive the laser beam to perform scanning, thus generating laser stripes; and 2) triggering a camera to be consistent with a scanning cycle of the MEMS galvanometer to acquire all laser stripes.

Second Step: Performing Matching to Obtain a Parallax 1) extracting all laser stripe skeletons in the entire image by using a threshold method, and then determining a normal direction of each pixel point on each skeleton, which is specifically performing curve fitting along the pixel points on the skeleton, by using a curve fitting method as follows: second-order fitting is performed on 10 pixel points by using $y=ax^2+bx+c$; let ($x_0$, $y_0$) be coordinates of the pixel points, and the slope of the point ($x_0$, $y_0$) is $t=2ax_0+b$; if $t=0$, then a weighted average direction is a direction y; and if $t \neq 0$, then a normal slope of the ($x_0$, $y_0$) point is $n=-1/t$, and the weighted average direction is a normal direction;

2) after calculating the normal direction of each point on the skeleton of the image, determining gray distribution of the laser stripe in its normal direction; finding the position of a centroid of the laser stripe, that is, the position of a contour point of the tested object there, by using a gray centroid method, and connecting the contour points to form a contour line of the cross section; and 3) extracting laser stripes from a left and a right laser stripe (point lattice) image and calculating a parallax $d_w$ in a one-to-one corresponding manner.

Third Step: Incorporating a Binocular Stereo Vision to Perform Reconstruction

The procedure after the parallax obtaining is the same as that in reconstruction by the fringe pattern method, and will not be repeated here.

3. Measurement by a Laser Stripe and Fringe Pattern Method

Two measurement modes, namely mode I and mode II, are adopted by different areas of the same to-be-measured surface, and data needs to be fused in such a manner that an acquired laser stripe image is multiplied with the ROI obtained in claim 3, and only data contained in the ROI is retained while the rest area is set to 0; likewise, a non-ROI area of an acquired fringe pattern picture is extracted. The obtained pictures are subsequently matched to obtain a parallax by using the same method as in the foregoing sections 1 and 2. This preprocessing can avoid data redundancy and interference of erroneous data during subsequent reconstruction after fusion. After the reconstruction, the three-dimensional data obtained by the two measurement methods is directly fused into one model, and seams of the fused model are eliminated by normal smoothing to obtain a complete model. The above description only involves preferred embodiments of the present disclosure, and does not limit the present disclosure in any form. Although the present disclosure has been disclosed as above with the preferred embodiments, the present disclosure is not limited thereto. Those skilled in the art can use the disclosed methods and technical contents described above to make some changes or modifications to produce equivalent embodiments without departing from the scope of technical solutions of the present disclosure. All simple modifications, equivalent changes, and modifications made to the above embodiments according to the technical essence of the present disclosure without departing from the contents of the technical solutions of the present disclosure still fall within the scope of the technical solutions of the present disclosure.

The foregoing description of the exemplary embodiments of the present invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A hybrid light measurement method for measuring a three-dimensional profile, comprising the following steps:

Step 1, selecting a measurement mode through adaptive recognition, by a camera, of surface reflectivity characteristics of an object, wherein mode I is a laser stripe measurement mode; mode II is a fringe pattern measurement mode; and mode III is a laser stripe and fringe pattern measurement mode; programming and projecting, by using an MEMS laser projection device, a laser stripe scanned along a camera baseline; emitting, by a projection device, a synchronization signal to trigger the camera to capture a sequence of laser stripe images reflected by the surface of the object, transmitting the laser stripe images to a computer for processing, and then projecting, by using the same projection device, a programmable laser sine fringe pattern to the surface of the object, performing n-steps phase shifting with $2\pi/n$ step length, enabling the camera to synchronously capture n fringe pattern images reflected by the surface of the object, and transmitting the fringe pattern images to the computer for processing; and Step 2, performing epipolar rectification on the laser stripe pictures taken by the camera and processed in the computer and the fringe pattern pictures projected by the projection device and processed in the computer, and extracting center pixel coordinates of all laser stripes, performing line-by-line matching to obtain a parallax image, and performing three-dimensional reconstruction on the object by using the parallax image and binocular stereo vision calibration results in mode I; or performing epipolar rectification on the acquired fringe pattern pictures, calculating a phase of each point in each picture, and performing phase unwrapping, performing line-by-line matching by using the same phase to obtain a parallax image, and performing three-dimensional reconstruction on the object by using the parallax image and the binocular stereo vision calibration results in mode II; or simultaneously calculating the two types of parallax images in mode I and mode II, performing three-dimensional reconstruction on the object by using the parallax image in mode I and the binocular stereo vision calibration results, and also performing three-dimensional reconstruction on the object by using the parallax image in mode II and the binocular stereo vision calibration results, to obtain two types of three-dimensional point cloud data, and fusing the two types of three-dimensional point cloud data according to the surface reflectivity characteristics of the object to obtain a complete object surface profile in mode Ill.

2. The hybrid light measurement method for measuring a three-dimensional profile as claimed in claim 1, wherein step 1 includes: a first step for setting optical parameters of a system: determining an operating range of a fringe pattern or laser stripe, and determining, according to an operating distance, a maximum operating distance $L_2$ and a minimum operating distance $L_1$, a maximum spot radius $\omega_{max}$ within the range of a depth of field $\Delta L$, and a number M of lines scanned for a single frame of fringe pattern image or laser stripe, wherein M is determined by characteristics of a laser beam;

a second step for generating drive signals: calculating parameters of drive signals of an MEMS galvanometer and a laser according to the system parameters determined in the first step, and generating the drive signals, which comprise: 1) an MEMS scanning galvanometer fast-axis drive signal; 2) an MEMS scanning galvanometer slow-axis drive signal; and 3) a laser drive signal; and a third step for generating fringe patterns or laser stripes: driving, by the galvanometer drive signals generated in the second step, the MEMS galvanometer to perform two-dimensional scanning; driving, by the laser drive signal generated in the second step, the laser to generate a laser beam with continuously modulated light intensity; radiating the laser beam to the surface of the galvanometer at a certain incident angle, and then reflecting the laser beam by the galvanometer to the surface of the object to form an analog fringe pattern with continuously modulated light intensity; and changing a frequency and a phase of the laser drive signal, to obtain fringe patterns with different fringe pattern pitches and phases; similarly, performing scanning, by the MEMS galvanometer, in the horizontal direction through a fast axis, and projecting a line of laser stripes in one scanning cycle; performing scanning in the vertical direction through a slow axis, and projecting a frame of laser stripes in one scanning cycle; wherein when matched with a frame rate of the camera, one laser stripe can be acquired in each frame to achieve large-resolution multi-light-pattern projection measurement.

3. The hybrid light measurement method for measuring a three-dimensional profile as claimed in claim 1, wherein in step 1: adaptive recognition, by a camera, of surface reflectivity characteristics of an object means that before measurement, the fringe pattern images of the tested object are acquired, and gray scale distribution and the contrast of the pictures are calculated, and when the contrast is lower than a set threshold or the gray scale reaches 255, the laser stripe measurement mode is selected for the area, and the area is set as an ROI to get ready for subsequent reconstruction, and the fringe pattern measurement mode is selected for the remaining area.

4. The hybrid light measurement method for measuring a three-dimensional profile as claimed in claim 1, wherein in step 2: when different measurement methods are adopted by different areas of the same to-be-measured surface, the data needs to be fused in such a manner that the acquired laser stripe image is multiplied with the ROI obtained in claim 3, and only data contained in the ROI is retained while the rest area is set to 0; likewise, a non-ROI area of the acquired fringe pattern picture is extracted; then the obtained pictures are subsequently matched to obtain the parallax; this preprocessing can avoid data redundancy and interference of erroneous data during subsequent reconstruction after fusion; and after the reconstruction, the three-dimensional data obtained by the two measurement methods is directly fused into one model, and seams of the fused model are eliminated by normal smoothing to obtain a complete model.

* * * * *